(12) United States Patent
Kosamana et al.

(10) Patent No.: US 10,584,634 B2
(45) Date of Patent: Mar. 10, 2020

(54) COMPRESSED-AIR-ENERGY-STORAGE (CAES) SYSTEM AND METHOD

(71) Applicant: Nuovo Pignone Srl, Florence (IT)

(72) Inventors: Bhaskara Kosamana, Bangalore (IN); Kalyan Kumar Venkatachalam, Bangalore (IN)

(73) Assignee: NUOVO PIGNONE SRL, Florence (IT)

( * ) Notice: Subject to any disclaimer, the term of this patent is extended or adjusted under 35 U.S.C. 154(b) by 0 days.

(21) Appl. No.: 15/104,395

(22) PCT Filed: Dec. 15, 2014

(86) PCT No.: PCT/EP2014/077705
§ 371 (c)(1),
(2) Date: Jun. 14, 2016

(87) PCT Pub. No.: WO2015/091329
PCT Pub. Date: Jun. 25, 2015

(65) Prior Publication Data
US 2016/0326958 A1 Nov. 10, 2016

(30) Foreign Application Priority Data

Dec. 16, 2013 (IT) ................. FI2013A0299

(51) Int. Cl.
*F02C 6/16* (2006.01)
*F02C 3/36* (2006.01)
(Continued)

(52) U.S. Cl.
CPC ................. *F02C 6/16* (2013.01); *F02C 3/36* (2013.01); *F02C 7/143* (2013.01); *H02K 7/1823* (2013.01);
(Continued)

(58) Field of Classification Search
CPC ... F02C 6/16; F02C 3/36; F02C 7/143; H02K 7/1823
See application file for complete search history.

(56) References Cited

U.S. PATENT DOCUMENTS 4,765,142 A * 8/1988 Nakhamkin .......... F01K 21/047
60/652
5,363,642 A * 11/1994 Frutschi .................... F02C 6/16
60/39.17
(Continued)

FOREIGN PATENT DOCUMENTS

| CN | 101289963 A | 10/2008 |
|---|---|---|
| CN | 102459847 A | 5/2012 |

(Continued)

OTHER PUBLICATIONS

Italy Search Report and Opinion issued in connection with corresponding IT Application No. FI2013A000299 dated Sep. 16, 2014.
(Continued)

*Primary Examiner* — Viet P Nguyen
(74) *Attorney, Agent, or Firm* — Baker Hughes Patent Organization (57) ABSTRACT

A compressed-air energy-storage system is described. The system includes a first compressor arrangement for compressing an air stream; a thermal energy storage unit, where through compressed air from the first compressor arrangement exchanges heat against a heat accumulation means; an air storage device arranged and configured for receiving and accumulating compressed air from the thermal energy storage unit; at least one expander for receiving compressed air from the air storage device and producing useful power therefrom. A further compressor arrangement is located between the thermal energy storage unit and the air storage device.

18 Claims, 5 Drawing Sheets

(51) Int. Cl.
*F02C 7/143* (2006.01)
*H02K 7/18* (2006.01)

(52) U.S. Cl.
CPC ...... *F05D 2210/12* (2013.01); *F05D 2220/32* (2013.01); *F05D 2220/76* (2013.01); *Y02E 60/15* (2013.01)

(56) References Cited

U.S. PATENT DOCUMENTS

| | | | |
|---|---|---|---|
| 5,379,589 A | 1/1995 | Cohn et al. | |
| 5,491,969 A * | 2/1996 | Cohn | F01B 17/00 60/775 |
| 5,634,340 A | 6/1997 | Grennan | |
| 5,778,675 A * | 7/1998 | Nakhamkin | F02C 6/16 60/39.17 |
| 7,299,638 B2 * | 11/2007 | MacKay | F01D 15/10 237/12.1 |
| 7,526,926 B2 * | 5/2009 | Rasmussen | F01D 15/005 290/52 |
| 9,383,105 B2 * | 7/2016 | Naeve | F02C 6/16 |
| 2003/0033811 A1 * | 2/2003 | Gerdes | F02C 6/003 60/772 |
| 2005/0178114 A1 * | 8/2005 | Althaus | F02C 6/16 60/407 |
| 2011/0094230 A1 * | 4/2011 | Finkenrath | F02C 1/02 60/727 |
| 2011/0094231 A1 * | 4/2011 | Freund | F02C 1/02 60/727 |
| 2011/0094236 A1 | 4/2011 | Finkenrath et al. | |
| 2011/0100213 A1 * | 5/2011 | Finkenrath | F02C 1/02 95/92 |
| 2012/0085087 A1 | 4/2012 | Canal et al. | |
| 2012/0102987 A1 * | 5/2012 | Anikhindi | F02C 6/16 62/93 |
| 2013/0042601 A1 * | 2/2013 | Kraft | F01K 27/00 60/327 |
| 2013/0061591 A1 * | 3/2013 | Bove | F02C 6/16 60/645 |
| 2014/0238022 A1 * | 8/2014 | Damgen | F02C 6/16 60/659 |
| 2015/0075173 A1 * | 3/2015 | Berti | F02C 6/16 60/774 |
| 2015/0167489 A1 * | 6/2015 | Heiligenstein | F01D 15/10 290/52 |

FOREIGN PATENT DOCUMENTS

| | | | | |
|---|---|---|---|---|
| CN | 102686851 A | 9/2012 | | |
| CN | 102758689 A | 10/2012 | | |
| DE | 102011112280 A1 | 3/2013 | | |
| EP | 2447501 A2 | 5/2012 | | |
| EP | 2450549 A2 * | 5/2012 | | F02C 6/003 |
| JP | S62-196031 A | 8/1987 | | |
| JP | S62-298623 A | 12/1987 | | |
| JP | S64-32001 A | 2/1989 | | |
| JP | 2007-263084 A | 10/2007 | | |
| JP | 2013-64399 A | 4/2013 | | |
| WO | WO 2013034284 A1 * | 3/2013 | | F02C 6/16 |
| WO | 2013/153019 A1 | 10/2013 | | |
| WO | 2013153019 A1 | 10/2013 | | |
| WO | WO 2013153019 A1 * | 10/2013 | | F02C 6/16 |

OTHER PUBLICATIONS

PCT Search Report and Written Opinion issued in connection with corresponding PCT Application No. PCT/EP2014/077705 dated Apr. 2, 2015.

Unofficial English translation of Office Action issued in connection with corresponding CN Application No. 201480068872.X dated Mar. 24, 2017.

Machine Translation and Second Office Action and Supplementary Search issued in connection with corresponding CN Application No. 201480068872.X dated Nov. 15, 2017.

Machine Translation and Notification of Reasons for Refusal issued in connection with corresponding JP Application No. 2016-558276 dated Nov. 20, 2018.

* cited by examiner

COMPRESSED-AIR-ENERGY-STORAGE (CAES) SYSTEM AND METHOD

BACKGROUND

Embodiments of the present invention relate to compressed-air energy-storage systems, also shortly called CAES systems. The disclosure also refers to methods for energy storage and electric energy production using CAES systems. More specifically embodiments of the present invention concern so-called adiabatic CAES systems (ACAES) also named advanced adiabatic CAES systems (AACAES).

CAES power plants or systems are commonly used as a means for optimizing the exploitation of energy. As known to those skilled in the art, the electric power required from the electric distribution grid varies with peaks of electric power requests during the day and reduced power request at nighttime. Large steam power plants or renewable power plants produce an amount of power, which cannot be varied at will. This causes an excess of power available on the electric distribution grid at nighttime and a power shortage during peak hours. Small power plants using gas turbines, especially aeroderivative gas turbines, have been implemented in order to cover the peak power requests. These plants can be turned on and shut down according to the variable power requirement during the 24 hours. This notwithstanding, further measures must be met, in order to store the energy in excess produced at night time and recover the stored energy to increase the electric power production during peak hours. One of the means used for that purpose is the CAES technology. These systems typically include a compression train having one or more compressors, which are driven by electric power from the grid during night time, i.e. when less power is required than available on the grid. Excess power available from the grid is thus transformed into pressure energy of the stored compressed air.

The compressed air is then exploited during the day to cover peak power requests from the grid, expanding the compressed air to a suitable pressure and burning an air/fuel mixture in a combustion chamber to generate combustion gases, which are expanded in a turbine for power generation.

In order to reduce the environmental impact of these plants, so-called adiabatic or advanced-adiabatic compressed-air energy-storage systems (ACAES or AACAES) have been developed. ACAES or AACAES systems do not make use of fossil fuel to convert the accumulated energy into electric power. Rather, they store heat generated by the process of air compression and recover the heat to increase the air temperature before expanding the compressed air through one or more expanders.

Figure 1:
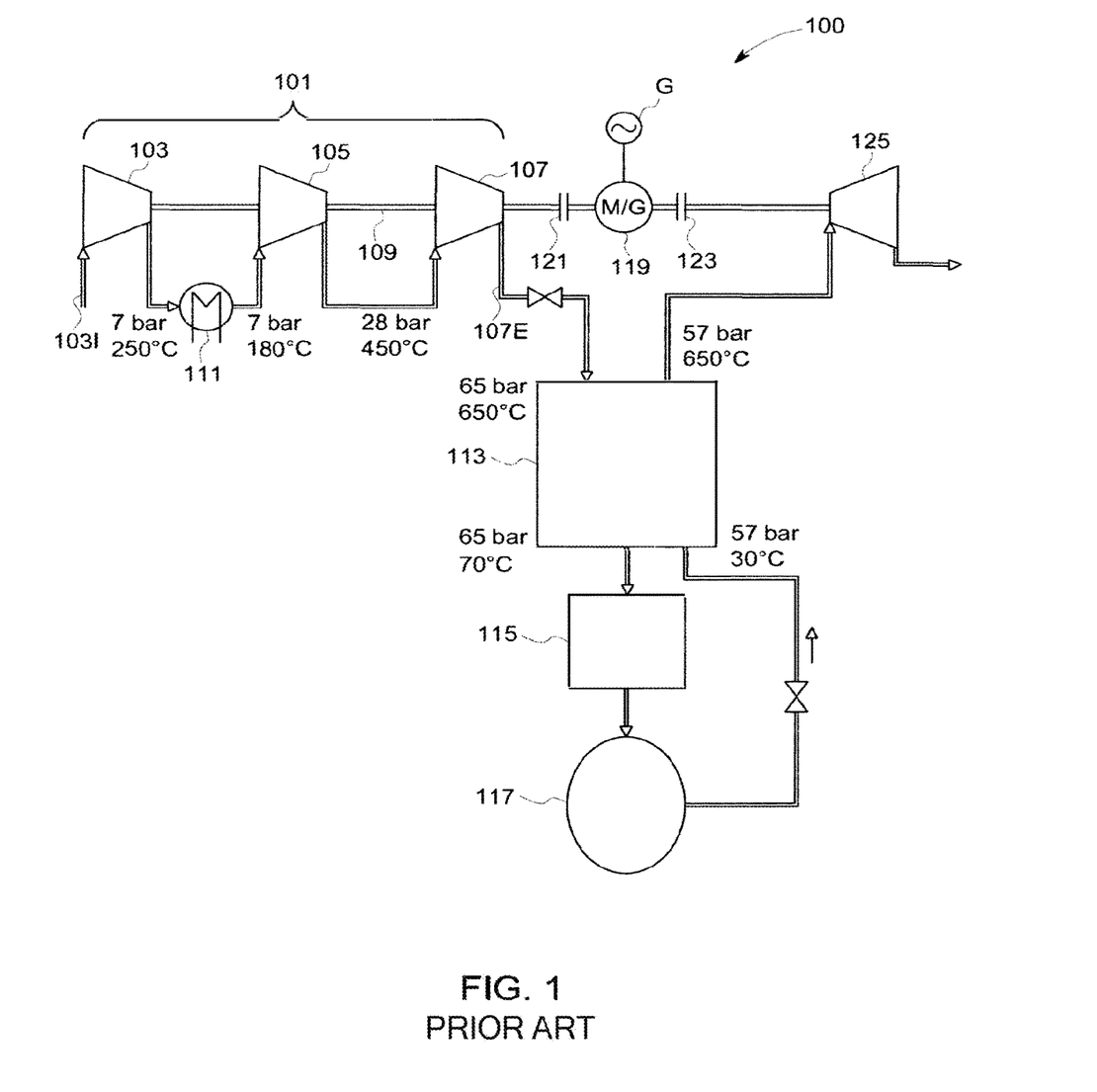
FIG. 1 schematically illustrates an AACAES or ACAES system according to the current art.

In FIG. 1 an AACAES or ACAES system according to the current art is schematically represented. The ACAES system is labeled 100 as a whole. The system includes a compressor train 101 which, in the exemplary embodiment shown in FIG. 1, has three serially arranged compressors 103, 105, 107, having a common shaft line 109. Air entering the first compressor 103 at the compressor inlet 103I is sequentially compressed at increasing pressure values and finally delivered at the outlet 107E of the last compressor 107. Between at least two sequentially arranged compressors, in the example between compressor 103 and compressor 105, an intercooler 111 is arranged. The intercooler is a heat exchanger wherein partially compressed air delivered from the upstream compressor is cooled before entering the next compressor, so that the volume of the air being processed is reduced by removing heat therefrom. Heat is removed by means of a heat exchange against ambient air, water or any other cooling medium. By removing heat from the partially compressed air the amount of mechanical power required to drive the compressor train 101 is reduced.

Compressed air exiting the compressor train at 107E flows through a thermal energy storage arrangement 113, wherein heat is removed from the compressed air flow and stored in a suitable thermal energy storage medium, for example a solid heat storage medium, such as rock, or a liquid heat storage medium such as oil, compressed water or glycol. In some known embodiments heat is stored in a heat storage medium which is selected so as to undergo a phase transformation from solid into liquid thus accumulating thermal energy in the form of latent liquefaction heat.

The cooled air is finally delivered through a safety cooler 115 and stored in an air storage device, for example a cavern 117. In the schematic of FIG. 1 exemplary pressure and temperature values of the air stream are indicated. These values are given by way of example only. Air exiting the first compressor 103 may have a pressure value of 7 bar and a temperature of 250° C. and is cooled down to 180° C. in the intercooler 111 before entering the second compressor 105. The air pressure is boosted up to 28 bar by the second compressor 105 and achieves a temperature of 450° C. before being processed by the last compressor 107 or compressor train 101, at the delivery side whereof the air may achieve a pressure of 65 bar and a temperature of 650° C. After cooling in the thermal energy storage unit air may have a temperature of 70° C. and substantially the same pressure as at the inlet side of the thermal energy storage unit, if pressure drop across the thermal energy storage unit is negligible.

The compressor train 101 can be driven by a reversible electric machine 119 which is selectively connectable with the shaft line 109 through a first clutch 121. The reversible electric machine 119 operates in the motor mode when excess power is available from an electric power distribution grid G. For example the reversible electric machine 119 can operate in the motor mode at night time so that electric power from the grid G is converted into thermal power accumulated in the thermal energy storage unit and in pressure energy stored in the form of compressed air in the compressed air storage device 117. When no power is available from the electric power distribution grid G, the first clutch 121 can be disengaged and the reversible electric machine 119 can remain at still stand.

If additional power is required from the electric power distribution grid G, the reversible electric machine 119 can be switched in the generator mode and connected, through a second clutch 123, to an expander 125. Compressed air from the air storage device 117 can then be delivered through the thermal energy storage unit to the expander 125. The compressed air from the air storage device 117 is heated up to for example 650° C. in the thermal energy storage unit by exchanging heat with the heat storage medium of the thermal energy storage unit 113. Compressed and heated air is expanded in the expander 125, which converts at least part of the power available in the compressed and heated air flow into useful mechanical power, which drives the reversible electric machine 119, thus producing electric power that is finally injected into the electric power distribution grid G.

BRIEF SUMMARY OF THE INVENTION

The efficiency of a compressed-air energy-storage system is improved by splitting the compression phase in a first compression step and a second compression step. When the CAES system is operated in the air-compression mode, heat is removed from the partially compressed air after the first compression step and prior to the second compression step. Heat removed from the partially compressed air is accumulated in a thermal energy storage unit, wherefrom thermal energy is recovered when the CAES system is operated in the energy-production mode.

Intercooling of the air stream between two sequentially arranged compressors can be omitted and replaced by a heat removal and storage phase, so that more thermal energy is available for subsequent re-use in the energy-production mode of the CAES system.

Power required for driving the compressors is reduced with respect to the current art arrangements.

In some embodiments, an intercooler can still be provided, e.g. between subsequently arranged compressors of a first compressor arrangement, in combination with a thermal energy storage unit arranged between the first compressor arrangement and a second compressor arrangement.

According to some embodiments, therefore, the subject matter disclosed herein specifically concerns a compressed-air-energy-storage system comprising: a first compressor arrangement for compressing an air stream; a thermal energy storage unit, through which compressed air from the first compressor arrangement exchanges heat against a heat accumulation means; an air storage device arranged and configured for receiving and accumulating compressed air from the thermal energy storage unit; at least one expander for producing useful power from the compressed and heated air. The system additionally includes a further compressor arrangement located between the thermal energy storage unit and the air storage device. The heat accumulation means can be any device, substance, arrangement, or the like, which is capable of accumulating and storing thermal energy removed from the partly compressed air flow and deliver the accumulated thermal energy to a cold stream of air or the like.

The expander can include an air expander, wherein compressed and heated air is expanded for producing mechanical power. An expander can also include a gas turbine, wherein combustion gases, generated by the combustion of compressed and heated air mixed with fuel. In general, unless differently indicated, in the context of the present disclosure and appended claims, the term expander shall be construed as a machine capable of converting at least part of heat and pressure energy of a compressible fluid flow into useful mechanical energy by expansion of the flow.

In some embodiments, compressed and heated air delivered by the thermal energy storage unit during the energy producing operation mode of the CAES system can be entirely expanded in at least one or more expanders, which convert the pressure and thermal energy of the air flow into useful mechanical energy without the use of fuel. The useful mechanical energy can be in turn converted into electric energy by an electric generator or a reversible electric machine. In this case the CAES system is a so-called adiabatic, or advanced adiabatic CAES system (AACAES or ACAES system).

In other embodiments, fuel can be added to the heated and compressed air stream, and the fuel and air mixture can be ignited to generate hot and pressurized combustion gases, which can be expanded in one or more turbines, for producing useful mechanical power. A combination of one or more air expanders and one or more gas turbines can also be envisaged. Hot and pressurized air can be partly expanded in the air expander(s) and the partly expanded, still hot air can then be mixed with a fuel and ignited to generate hot and pressurized combustion gases, which are expanded in one or more gas turbines.

In both situations there may be benefits of overall system efficiency that can be achieved by the arrangement disclosed herein.

According to some embodiments, the first compressor arrangement includes a plurality of sequentially arranged compressors, with no intercooler arranged therebetween. The second compressor arrangement can include one or more sequentially arranged compressors. A safety heat exchanger can be arranged between the last compressor and the compressed-air storage device.

In some embodiment, a first electric machine can be provided for driving the first compressor arrangement and a second electric machine can be provided for driving the further compressor arrangement. A speed manipulation device can be provided for one of the electric machines or both the electric machines.

In some embodiments, for example, a gearbox can be provided between the first electric machine and/or the second electric machine, and at least one of the compressors of the first compressor arrangement or of the further compressor arrangement.

In some embodiments, a variable frequency driver can be provided for one or both the electric machines, so that the rotary speed thereof can be changed, e.g. depending upon the operating conditions, such as the suction and delivery pressure.

In other embodiments a single electric machine can be used for driving into rotation all the compressors of the system. Suitable gearbox(es) can be provided for modifying the rotary speed of the compressors.

At least one of the electric machines used for driving the compressor(s) can be a reversible electric machine, which can be selectively drivingly connected to the compressor(s) or the expander. In other embodiments, separate electric machines can be used to respectively drive the compressor (s) and convert the mechanical energy generated by the expander.

According to a further aspect, the present disclosure also relates to a method for operating a compressed-air energy-storage system. The method includes the steps of: partly compressing a flow of air at a first pressure; removing heat from the partly compressed air and storing thermal energy; further compressing the partly compressed and cooled air at a second pressure; and storing the further compressed air in an air storage device.

The method can further include the steps of: heating the compressed and cooled air through stored thermal energy; and expanding heated compressed air in at least one expander and producing useful energy therefrom.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of embodiments of the present invention. It is important, therefore, that the claims be regarded as including such equivalent constructions insofar as they do not depart from the spirit and scope of embodiments of the present invention.

BRIEF DESCRIPTION OF THE DRAWINGS

A more complete appreciation of the disclosed embodiments of the present invention and many of the potential benefits thereof will be readily obtained as the same becomes better understood by reference to the following detailed description when considered in connection with the accompanying drawings, wherein.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit embodiments of the present invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the following description embodiments of the subject matter will be described in connection with ACAES or AACAES systems. It shall be understood, however, that embodiments may also relate to a CAES system where compressed air is partly expanded and subsequently mixed with fuel to produce compressed combustion gases which are expanded in a gas turbine to produce further useful power.

Figure 2:
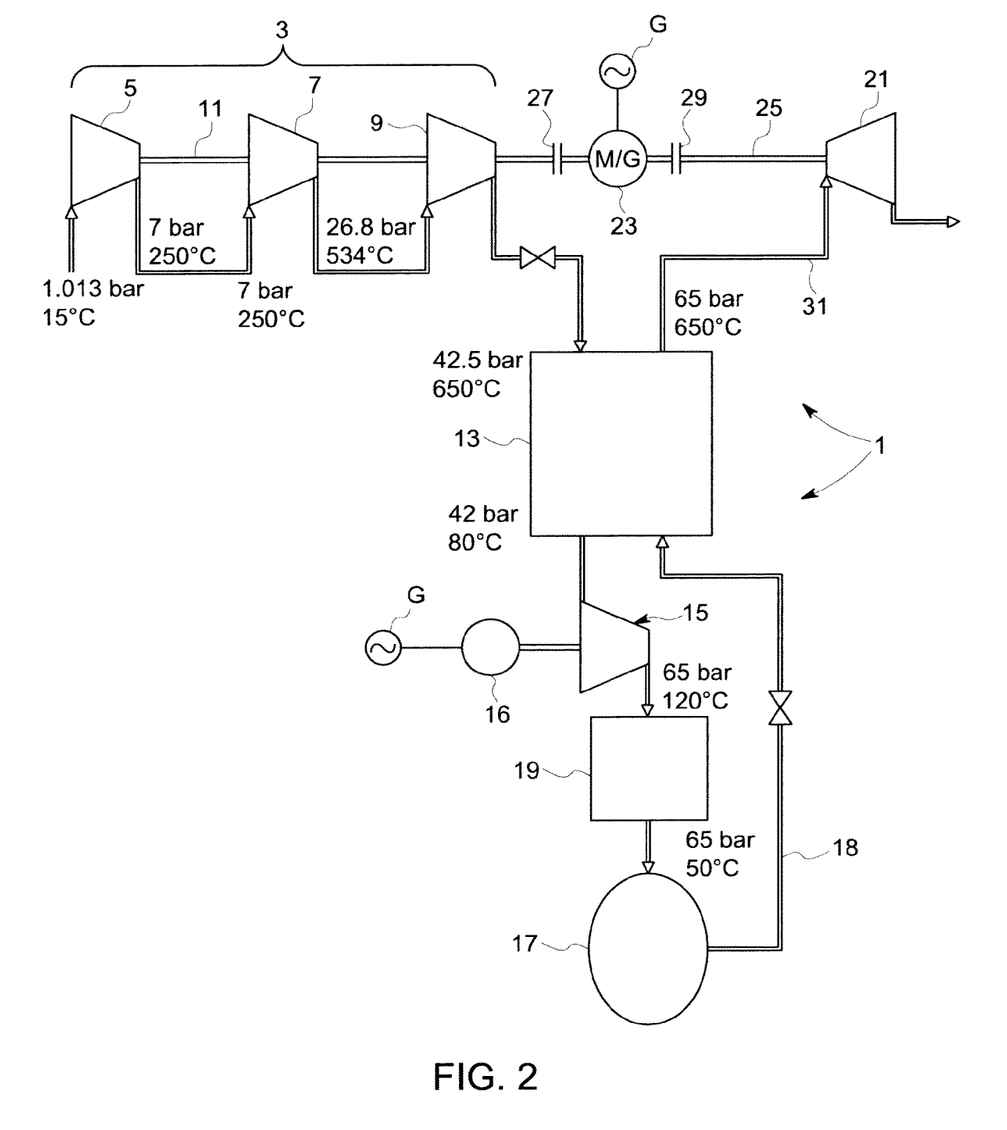
FIG. 2 schematically illustrates an ACAES system according to the present disclosure.

Referring to FIG. 2, an exemplary embodiment of an ACAES system according to the present disclosure is schematically shown and labeled 1 as a whole. The ACAES system 1 can include a compressor or a compressor train 3 which compresses ambient air using excess electric power available from an electric power distribution grid G.

In some embodiments the compressor train 3 includes a plurality of sequentially arranged compressors 5, 7 and 9. In other embodiments, not shown, a single compressor can be provided. In yet further embodiments, as will be discussed later on, more than one compressor train 3 can be provided in parallel, to process a larger air flow rate.

The compressors 5, 7 and 9 can be connected by a single shaft line 11.

Ambient air is ingested by the first compressor 5, processed and compressed up to a first pressure value and then delivered to the second compressor 7 without intercooling. The second compressor 7 processes the air stream up to a second pressure value and delivers the compressed air stream to the inlet of the third compressor 9 without intermediate intercooling. A different number of compressors can be provided in the train, for example two or more than three compressors or compressor stages. In any event, in embodiments, no intercooler is provided between sequentially arranged compressors of the compressor train 3.

Exemplary pressure and temperature values at the suction side and delivery side of each compressor 5, 7 and 9 are indicated in FIG. 2. Those values shall be understood as being merely exemplary and do not limit the scope of the present disclosure.

Inlet air may have a temperature of 15° C. and a 1 bar pressure (absolute) and in some embodiments will exit first compressor 5 at 250° C., and at a pressure of e.g. approximately 7 bar. The air inlet conditions at the suction side of the second compressor 7 are substantially the same as at the delivery side of the first compressor 5. Air exiting the second compressor 7 may have a pressure of around 26-27 bar, e.g. 26.8 bar and a temperature of around 500-550° C., for instance 534° C. In the last compressor 9 the air pressure is increased up to around 40-45 bar, e.g. about 42.5 bar and will have a temperature of around 600-680° C., e.g. about 650° C.

The ACAES system 1 further includes a thermal energy storage unit 13 through which the compressed air stream delivered by the compressor train 3 flows. The thermal energy storage unit 13 can contain a heat storage medium, for example a solid or a liquid heat storage medium or a heat storage medium which undergoes a phase transformation, e.g. from solid to liquid, thus accumulating latent liquefaction heat.

Air is delivered at an exit side of the thermal energy storage unit 13 at substantially the same pressure achieved at the delivery side of the last compressor 9 or at a slightly lower pressure, due to the pressure drop across the thermal energy storage unit 13. Due to heat removal from the compressed air flow, the temperature of the air delivered from the thermal entry storage unit 13 is substantially lower than the temperature at the delivery side of compressor 9. By way of example only, the air flow exiting the thermal energy storage unit 13 may have a temperature of around 70-90° C., e.g. about 80° C. and a pressure of around 40-45 bar, e.g. about 42 bar.

Downstream of the thermal energy storage unit 13 a further compressor arrangement 15 is provided. In the schematic representation of FIG. 2 the further compressor arrangement 15 is driven by a separate electric motor 16. Air exiting the thermal energy storage unit 13 is ingested by the further compressor arrangement 15 and delivered to an air storage device, such as a cavern or the like, schematically shown at 17.

In some embodiments a safety cooler 19 can be arranged between the delivery side of the further compressor arrangement 15 and the air storage device 17.

Exemplary pressure and temperature values of the air stream delivered by the further compressor arrangement 15 are indicated in FIG. 2. In some embodiments a pressure of around 60-70 bar, e.g. about 65 bar can be achieved, while the air temperature can be increased to around 110-130° C., e.g. about 120° C. at the delivery side of the further compressor arrangement 15. After cooling in the safety cooler 19 the air flow will have a temperature around 40-60° C., e.g. about 50° C.

The AACAES system 1 of FIG. 2 further includes at least one expander 21, wherein compressed and heated air can be expanded to produce useful mechanical energy during daytime. The expander 21 can be put in fluid communication through a compressed air duct 31 with the air storage device 17.

In some embodiments a single reversible electric machine 23 can be selectively engaged with the shaft line 11 of the compressor train 3 and with a shaft 25 of the expander 21. A first clutch 27 can be provided for connecting the reversible electric machine 23 to the shaft line 11. A second clutch arrangement 29 can be provided for drivingly connecting the expander 21 to the reversible electric machine 23.

The AACAES system 1 described so far operates as follows.

If excess electric power is available from the electric power distribution grid G, the reversible electric machine 23 is switched in the motor mode and is operated to drive the compressor train 3 by engaging the first clutch 27. Electric power from the grid G is also used to drive the motor 16. Ambient air is thus sequentially compressed by the first, second and third compressors 5, 7, 9 of the compressor train 3 and delivered through the thermal energy storage unit 13, where heat is removed from the compressed air flow. Cooled air exiting the thermal energy storage unit 13 is further compressed in the further compressor arrangement 15, cooled in the safety cooler 19 and stored at high pressure in the air storage device 17.

When the maximum pressure in the air storage device 17 has been achieved and/or if no power is available from the electric power distribution grid G, the reversible electric machine 23 and the electric motor 16 are stopped and the first clutch 27 can be disengaged.

If supplemental power is required by the electric power distribution grid G, pressure energy is available in the air storage device 17 and heat energy is available in the thermal energy storage unit 13, the reversible electric machine 23 can be switched in the generator mode and the clutch 29 can be engaged. Compressed air from the air storage device 17 flows through the thermal energy storage unit 13, is heated exploiting the thermal energy accumulated in the thermal energy storage unit 13 and is finally delivered to the expander 21. A compressed air delivery line 18 can be provided for delivering compressed air from the air storage device 17 to the thermal energy storage unit 13.

The expander 21 converts power from the compressed and heated air flow into mechanical power available on the shaft 25 which, through clutch 29, drives the reversible electric machine 23, which is operating in the generator mode, so that mechanical power is finally converted into electric power and injected in the electric power distribution grid G.

In other embodiments, not shown, two different electric machines can be provided for driving the compressor train 3 and for converting mechanical power from the expander 21 into useful electric power. In that case, clutches 27 and 29 can be omitted. A first electric machine continuously operating in the motor mode can be stably connected to the shaft line 11 and a second electric machine, continuously operating in the generator mode, can be stably connected to the shaft 25 of the expander 21.

Figure 3:
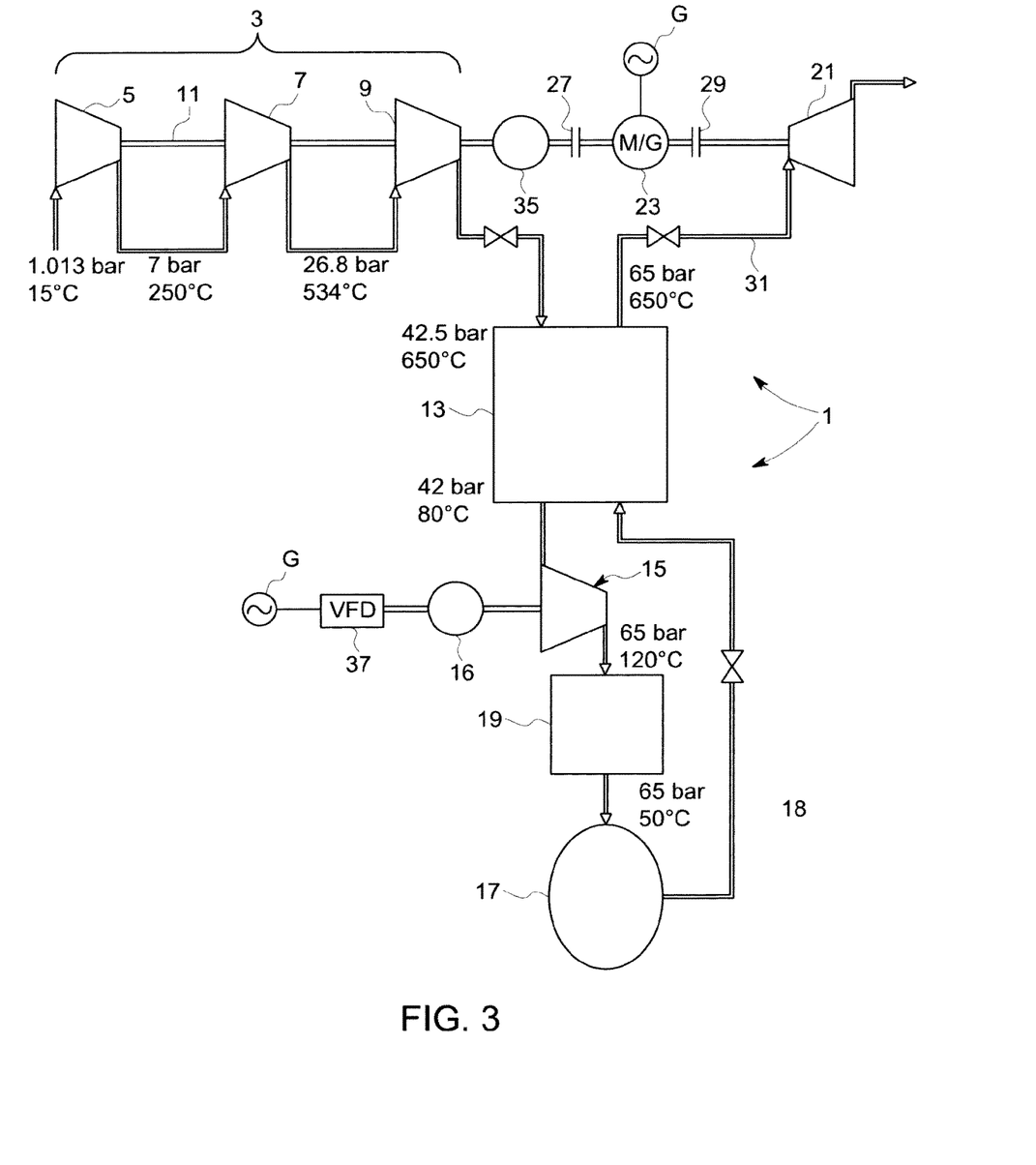
FIGS. 3, 4 and 5 illustrate schematically three exemplary embodiments of the compressor trains used in ACAES system according to the present disclosure.

FIG. 3 schematically illustrates more details of a possible embodiment of the compressor arrangements of the ACAES system 1 of FIG. 2. The same reference numbers indicate the same components as illustrated in FIG. 2.

In the embodiment illustrated in FIG. 3, a speed manipulating device, e.g. a gear box 35 is provided between the reversible electric machine 23 and the shaft line 11. The gear box 35 provides the correct transmission ratio between the electric machine 23 and the shaft line 11.

In some embodiments, as shown by way of example in FIG. 3, the electric motor 16 which drives the further compressor arrangement 15 can be provided with a variable frequency driver 37, which can modify the AC current frequency from the electric power distribution grid G so that the rotary speed of the electric motor 16 and thus rotary speed of the further compressor arrangement 15 can be adjusted within a rather wide range according to operating conditions of the system.

In other embodiments, not shown, also the reversible electric machine 23 can be powered by a variable frequency driver. In some embodiments, the gear box or other speed manipulating device 35 can be omitted.

In the exemplary embodiments of FIGS. 2 and 3 the further compressor arrangement 15 is driven by a separate electric motor 16, different from the reversible electric machine 23 which drives the compressor train 3. This, however, is not mandatory and should not be considered as a limiting feature of the present disclosure.

Figure 4:
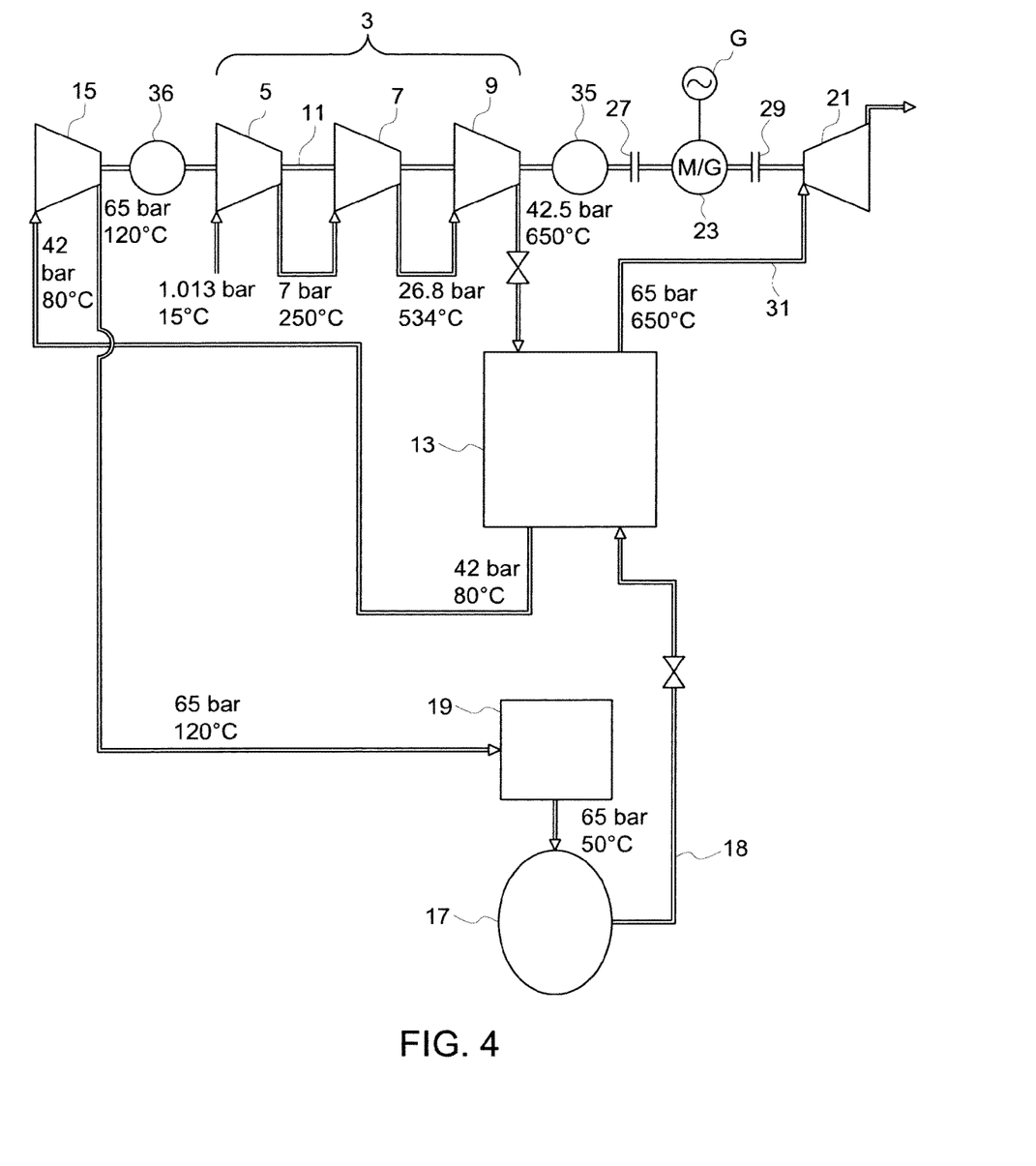

By way of example, in FIG. 4 a further embodiment is shown, wherein a single electric machine is used to drive the entire set of compressors, namely compressors 5, 7 and 9 forming the compressor train 3 as well as the further compressor arrangement 15. In the exemplary embodiment of FIG. 4 a reversible electric machine 23 is provided for that purpose and the electric motor 16 can be omitted. A double clutch arrangement made up of the first clutch 27 and the second clutch 29 can be provided for selectively connecting the reversible electric machine 23 to the compressor arrangement 3, 15 and to the expander 21. In other embodiments, as mentioned above, the electric machine 23 can be operated in the motor mode only and can be used to drive the compressors, while a separate electric generator is connected to the expander 21 for converting the mechanical power generated by the expander 21 into electric power. In that case the clutch 29 would be omitted. Also clutch 27 could be omitted and the motor 23 could be permanently connected to the shaft line of the compressors.

Further referring to FIG. 4, in some embodiments a first gear box, or other speed manipulating device 35, can be provided between the electric machine 23 and the compressor train 3. In some embodiments a further gear box, or other speed manipulating device 36, can be provided between the compressor train 3 and the further compressor arrangement 15. In this way the compressor train 3 can rotate at a rotary speed different from the rotary speed of the further compressor arrangement 15.

In other embodiments, not shown, the motor 23 or the reversible electric machine 23 can be driven through a variable frequency driver such as the variable frequency driver 37 shown in FIG. 3. This would allow the rotary speed of the reversible electric machine or motor 23 to be modified according to needs within a rather wide range. One or both gear boxes 25 and 37 could be omitted. In some embodiments, the reversible electric machine 23 can be driven by a variable frequency driver 37 at a speed corresponding to the rotary speed of the compressor train 3, while the gear box 36 is maintained so that the further compressor arrangement 15 can be driven at a rotary speed different from the rotary speed of the electric machine 23 and the compressor train 3.

Figure 5:
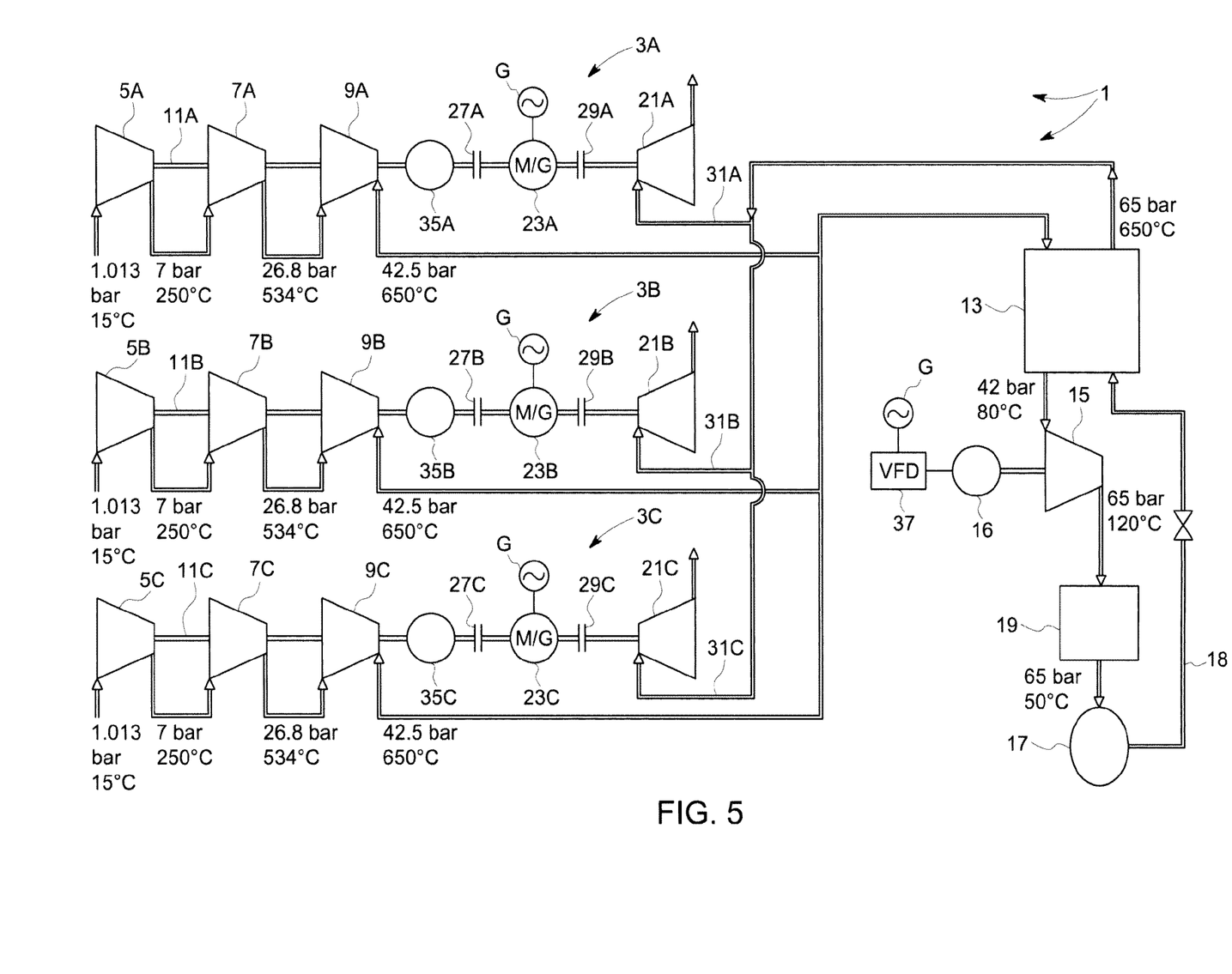

FIG. 5 illustrates a further embodiment of the compressor arrangements which can be used in the ACAES system 1 of FIG. 2.

In this embodiment three different compressor trains 3A, 3B and 3C are provided. Each compressor train 3A, 3B and 3C can be made up of a plurality of compressors, for example three compressors. In FIG. 5 the compressor train 3A includes compressors 5A, 7A and 9A; compressor train 3B includes compressors 5B, 7B and 9B; compressor train 3C includes compressors 5C, 7C and 9C. The three compressor trains can be arranged in parallel, i.e. the delivery side of the most downstream compressors 9A, 9B, 9C can be connected to one another to deliver a single stream of compressed air through the thermal energy storage unit 13.

Each compressor train 3A, 3B and 3C can include an electric motor or a reversible electric machine 23A, 23B and 23C, respectively. A clutch 27A, 27B and 27C can be provided for connecting each electric motor or reversible electric machine 23A-23C to the respective shaft line 11A, 11B, 11C of the respective compressor train 3A-3C.

In some embodiments, respective gear boxes or other speed manipulating devices 35A, 35B, 35C can be provided between each electric motor or reversible electric machine 23A-23C and the respective shaft line 11A-11C of each compressor train 3A-3C.

One, two or all the reversible electric machines 23A-23C can be selectively connected through respective second clutches 29A-29C to respective expanders (not shown) similar to expander 21.

In other embodiments, the electric machines 23A-23C can be operated in the motor mode only, and one or more electric generators can be connected to one or more expanders for power conversion purposes. In some embodiments a single expander and a single generator can be provided for processing the hot compressed air and produce useful mechanical power therefrom.

In further embodiments, not shown, the electric machines 23A, 23B and 23C can be driven by a variable frequency driver, to adjust their rotary speed according to the operating conditions.

A single further compressor arrangement 15, which in turn can include a single compressor or a compressor train, can be combined with the three compressor trains 3A-3C. In some embodiments, similarly to the embodiment of FIG. 3, a separate electric motor 16 can be provided for driving the further compressor arrangement 15. In some embodiments the electric motor 16 can be driven by a variable frequency driver as already disclosed in connection with FIG. 3.

The novel arrangements described above improve the total efficiency of the ACAES system over similar systems of the current art. More specifically, as will be shown by the following example, under the same flow rate conditions and achieving the same temperature of the thermal energy storage medium and the same air pressure in the air storage device, the total power consumption of a system according to the present disclosure is less than the power consumption of the system according to the current art.

EXAMPLE

System efficiency of embodiments of the invention can be better appreciated by comparing the efficiency of an AACAES system according to FIG. 1 (state of the art) with the efficiency of a system according to FIG. 2 using the same turbomachinery.

An ACAES system according to FIG. 1, using the following compressors:
- compressor 103: Axial 6 stages compressor
- compressor 105: MCL 805
- compressor 107: BCL605 with a flow rate of 101.5 kg/s will require a power of 75.87 MW at mid compression, i.e. a mid point between the starting of compression to end of compression, the point corresponding to the design point of the compressors used. It shall be noted that while the ACAES system is operating in the compression phase, the discharge pressures of each compressor varies from the starting value to a final value, corresponding to a condition when the maximum pressure in the cavern 17 has been achieved.

In a system according to FIG. 2, using the following compressors:
- compressor 5: Axial 6 stages compressor
- compressor 7: MCL 805
- compressor 9: BCL603
- compressor 15: BCL351 with a flow rate of 101.5 kg/s will require a power of 73.17 MW at mid compression.

Thus, the system according to the present disclosure has a consumption which is 2.7 bar lower than the prior art system. Additionally, the air/air intercooler 111 is removed, thus reducing the cost of the system and the footprint thereof.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. Different features, structures and instrumentalities of the various embodiments can be differently combined.

What is claimed is:

1. A compressed-air energy-storage system comprising:
   a first compressor arrangement configured to compress an air stream, the first compressor arrangement comprising a plurality of compressor trains, each compressor train comprising a plurality of sequentially arranged compressors and a motor to drive the sequentially arranged compressors, wherein the motor of at least one of the plurality of compressor trains is a reversible electric motor operating as an electric generator when the system operates in an electric power generation mode;
   a thermal energy storage configured to store thermal energy removed from the compressed air stream from the first compressor arrangement;
   a second compressor arrangement configured to further compress the compressed air stream exiting the thermal storage energy storage unit, the second compressor arrangement comprising a compressor and a motor to drive the compressor, wherein the motor of the second compressor arrangement is separate and distinct from the respective motor of each of the plurality of compressor trains;

an air storage device configured to receive and accumulate the further compressed air stream from the second compressor arrangement; and at least one expander configured to receive the further compressed air stream from the air storage device and produce useful power therefrom.

2. The system of claim 1, wherein the air stream compressed by the first compressor arrangement has a pressure around 40-45 bar and a temperature around 600-680° C.

3. The system of claim 1, wherein a compressed air delivery duct connects the air storage device to the at least one expander, the compressed air delivery duct being in heat exchange relation with the thermal energy storage unit such that compressed air from the air storage device receives heat from the energy storage device before entering the at least one expander.

4. The system of claim 1, further comprising at least one clutch to mechanically connect the respective motor of at least one of the plurality of compressor trains selectively to the at least one expander and/or the respective compressor train driven by the motor.

5. The system of claim 1, wherein a speed manipulation device is arranged between at least one of the plurality of compressor trains and the respective motor driving said compressor train.

6. The system of claim 1, further comprising a variable frequency driver to control rotational speed of the motor of the second compressor arrangement.

7. The system of claim 1, wherein each of the plurality of compressor trains comprises at least one speed manipulation device arranged between the relevant motor and a shaft line driving into rotation the compressors of the relevant compressor train.

8. The system of claim 1, wherein the air storage device is positioned between the second compressor arrangement and the thermal energy storage unit.

9. The system of claim 8, wherein the thermal energy storage unit is positioned between the air storage device and the expander.

10. The system of claim 9, further comprising a delivery line fluidly coupling the air storage device to the thermal energy storage unit and configured to deliver the further compressed air stored in the air storage device to the thermal energy storage unit before said further compressed air enters the expander.

11. The method of claim 10, wherein one fluid path of the thermal energy storage unit is between the first compressor arrangement and the second compressor arrangement and another fluid path of the energy storage device is between the air storage device and the expander.

12. The system of claim 11, wherein a safety cooler is arranged between the second compressor arrangement and the air storage device.

13. The system of claim 1, wherein no intercooler is provided between the sequentially arranged compressors of each of the plurality of compressor trains.

14. A method for operating a compressed-air energy-storage system comprising:

compressing a flow of air with a first compressor arrangement at a first pressure, the first compressor arrangement comprising a plurality of compressor trains, each compressor train comprising a plurality of sequentially arranged compressors driven by a motor, wherein the motor of at least one of the plurality of compressor trains is a reversible electric motor operating as an electric generator when the system operates in an electric power generation mode;

flowing the compressed air at the first pressure through a thermal energy storage unit for removing heat from the compressed air and storing thermal energy in the thermal energy storage unit;

further compressing the compressed air from the thermal energy storage unit at a second pressure using a second compressor arrangement, the second compressor arrangement comprising a compressor driven by a motor separate and distinct from the respective motor of each of the plurality of compressor trains, and delivering the further compressed air to an air storage device; and storing the further compressed air in the air storage device.

15. The method of claim 14, further comprising:

delivering compressed air from the air storage device to the thermal energy storage unit;

heating the compressed air with thermal energy from the thermal energy storage unit; and expanding the heated compressed air in at least one expander and producing useful energy therefrom.

16. The system of claim 14, wherein no intercooler is provided between the sequentially arranged compressors of each of the plurality of compressor trains.

17. A compressed-air energy-storage system comprising:

a first compressor arrangement configured to compress an air stream, the first compressor arrangement comprising a plurality of compressor trains, each compressor train comprising a plurality of sequentially arranged compressors and a motor to drive the sequentially arranged compressors, wherein the motor of at least one of the plurality of compressor trains is a reversible electric motor operating as an electric generator when the system operates in an electric power generation mode;

a thermal energy storage unit configured to receive the first compressed air stream from the first compressor arrangement, the thermal energy storage unit having a thermal energy storage medium configured to store thermal energy from the first compressed air stream;

a second compressor arrangement configured to receive the first compressed air stream from the thermal energy storage unit and compress the first compressed air stream into a second compressed air stream, the second compressor arrangement comprising a compressor driven by a second motor separate and distinct from the respective motor of each of the plurality of compressor trains;

a variable frequency driver to control rotational speed of the motor of the second compressor arrangement;

an air storage device positioned between the second compressor arrangement and the thermal energy storage unit and configured to receive and accumulate the second compressed air from the second compressor arrangement;

at least one expander configured to receive the second compressed air stream from the air storage device and to produce power therefrom; and a compressed air delivery duct fluidly connecting the air storage device to the at least one expander, the compressed air delivery duct passing through the thermal energy storage unit in heat exchange relation with the thermal energy storage unit before entering the expander, such that the second compressed air from the air storage device receives heat from the thermal energy storage medium when entering the at least one expander.

18. The system of claim 17, wherein no intercooler is provided between the sequentially arranged compressors of each of the plurality of compressor trains.

* * * * *